April 4, 1961 J. ROSENKRANDS 2,978,255
INDEPENDENT FRONT WHEEL SUSPENSION
Filed June 26, 1958 2 Sheets-Sheet 1

INVENTOR.
Johannes Rosenkrands
BY
W. S. Pettigrew
ATTORNEY

United States Patent Office 2,978,255
Patented Apr. 4, 1961

2,978,255
INDEPENDENT FRONT WHEEL SUSPENSION
Johannes Rosenkrands, Detroit, Mich., assignor to General Motors Corporation, Detroit, Mich., a corporation of Delaware
Filed June 26, 1958, Ser. No. 744,838
9 Claims. (Cl. 280—112)

This invention relates to independent suspension for vehicle wheels, and more particularly to independent suspension for dirigible wheels in which the latter are rotatably supported on the outer ends of two laterally extending links having inner ends pivoted one above the other on the vehicle frame in a manner permitting swinging movement in a substantially vertical plane transverse to the centerline of the vehicle.

The type of suspension referred to is well known in the prior art and is commonly referred to as parallel wishbone suspension, the most familiar form of which is the so-called long and short arm wishbone suspension in which the upper and lower arms respectively are of substantially different lengths, the lower usually being considerably longer than the upper. This and other types of wishbone suspensions are capable of an exceedingly large number of variations in addition to dissimilar lengths, one of the more important of which is the initial or design height inclination of the projected planes of the arms. By properly selecting design height inclination of the projected planes of the arms, it is possible to locate the roll center of the vehicle in any desired vertical level. Although this flexibility of design, together with other characteristics of wishbone suspension, has led to almost universal adoption thereof, in practice, conventional wishbone type suspensions employ an arrangement in which the roll center is on or very near the ground in order to reduce lateral tire scrub during parallel ride deflection. Although for this reason and certain other purposes a low roll center at the front of the vehicle is desirable, under conditions of vehicle roll a relatively high roll center is more advantageous. However, when the geometric arrangement of conventional wishbone arm suspension is modified to afford a high roll center, the resulting construction invariably produces excessive change in tread width, since the wheels do not remain substantially perpendicular to the ground during parallel deflection of the sprung mass.

An object of the present invention is to provide an improved vehicle suspension.

Another object is to provide an improved parallel wishbone type independent vehicle wheel suspension.

A further object is to provide a wishbone type suspension for dirigible wheels which produces a relatively high roll center while preventing substantial variation in tread width.

Yet a further object is to provide a suspension of the type described in which the effective roll center is high during rolling movement of the sprung mass and relatively low during parallel ride motion.

Still a further object is to provide suspension of the type described having a high roll deflection axis and a low parallel deflection axis.

These and other objects, advantages and features of the invention will become more fully apparent as reference is had to the accompanying specification and drawings wherein.

Figure 1:
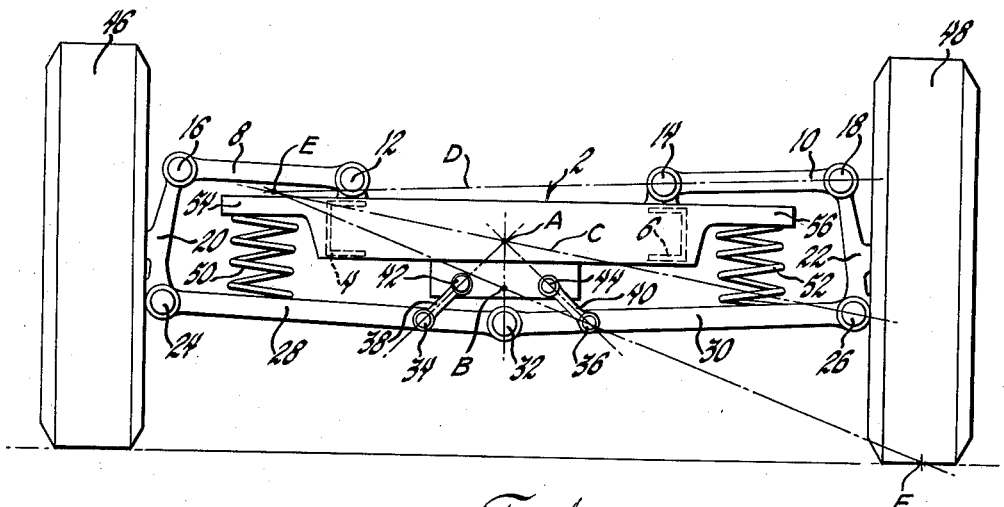
Fig. 1 is a front elevation of a vehicle frame with suspension means for the dirigible front wheels in accordance with the present invention, the structure being shown in the geometric relation existing when the sprung mass of the vehicle is at design height.

Referring now to the drawings and particularly Fig. 1, reference numeral 2 designates a vehicle front cross frame member which is attached in the usual manner to side frame channel members 4 and 6. Extending laterally from opposite sides of cross member 2 are upper laterally extending control arms 8 and 10, the inboard ends of which are pivotally connected to member 2 at 12 and 14, respectively. At their outer ends, arms 8 and 10 are pivotally connected at 16 and 18 to the upper ends of vertically extending wheel supporting members 20 and 22. The lower ends of members 20 and 22, in turn, are pivotally connected at 24 and 26 to the outer ends of laterally extending lower control arms 28 and 30 which are spaced substantially vertically below upper arms 8 and 10. In accordance with the present invention, the respective inner ends of arms 28 and 30 are connected together by a common pivot 32. At either side of pivot 32, lower arms 28 and 30 have pivotally connected thereto at 34 and 36 a pair of relatively short vertically directed links 38 and 40, the opposite ends of which are pivoted to cross member 2 at 42 and 44. As seen in Fig. 1, the projected planes of links 38 and 40 converge upwardly so as to intersect at the point A, which point is co-linear with the longitudinal centerline of the vehicle. To resiliently support the frame 2 with respect to the vehicle wheels 46 and 48, a pair of coil springs 50 and 52 are interposed between outrigger spring seats 54 and 56 on cross member 2 and an intermediate portion of lower control arms 28 and 30, respectively.

Figure 2:
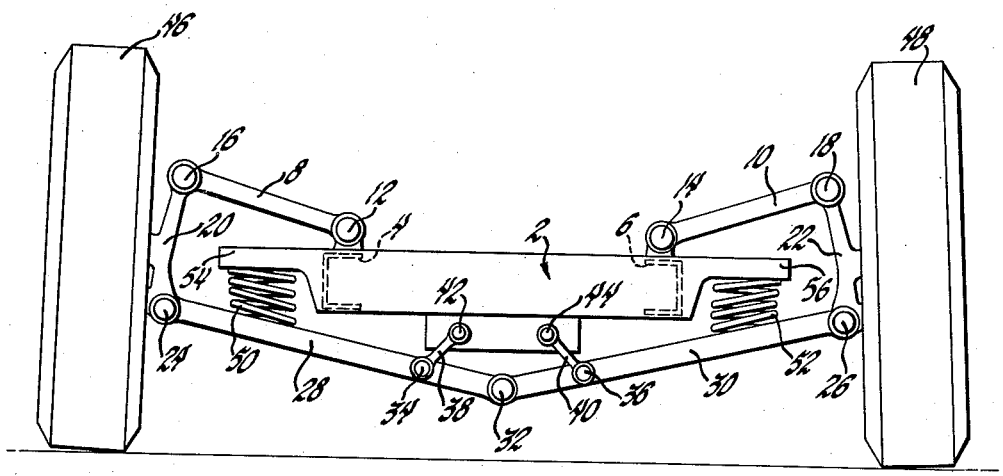
Fig. 2 is a view similar to Fig. 1 showing the geometric relation of the parts when the sprung mass is in a parallel downwardly deflected position.

When arranged in the manner described, under conditions of parallel ride deflection, the linkage of the subject invention produces wheel movement substantially identical to that obtained by conventional wishbone suspension. Thus, as illustrated in Fig. 2, upper arms 8 and 10 swing about their respective inboard pivots 12 and 14, while lower control arms 28 and 30 swing about inboard axes defined by pivots 34 and 36, respectively. However, when negotiation of a curve induces outward tilting or roll deflection of the sprung mass, links 38 and 40 operate to modify the axis of motion of the lower control arms 28 and 30 so that the instantaneous roll center of the sprung mass thereof is defined by the point B (Fig. 1). Point B is determined in accordance with conventional practice employed in determining the instantaneous roll center of parallel wishbone suspension. For a complete description of the method of determining the instantaneous roll center of a vehicle having parallel wishbone suspension, reference may be had to U.S. 2,092,612 Olley, assigned to General Motors Corporation.

In determining the instantaneous roll center of a vehicle incorporating the present invention, account must be taken of the fact that in roll, the respective lower control arms swing about an imaginary axis A rather than the axis of respective pivots 34 and 36. Thus, as seen in Fig. 1, the effective projected plane C of lower control arm 30 extends through pivot 26 and point A. The plane C thus projected intersects the projected plane D of upper control arm 10 at point E. A line drawn from the intersection E to the point of contact of the wheel 48 intersects the vertical longitudinal midplane at the point B, the instantaneous roll center previously referred to. By contrast, during parallel ride motion, the effective axis of motion of each wheel is determined by projecting planes of the upper control arms and the portions of the lower control arms between pivots 24, 34 and 26, 36, respectively. Inasmuch as these planes are substantially parallel, intersection thereof will fall at or near infinity; hence, a line drawn from the intersection at infinity to the point of contact of the respective wheel will intersect the vertical longitudinal midplane of the vehicle at or near the ground, thus substantially duplicating the geometric effect obtained by conventional low roll center wishbone suspensions during parallel ride deflection.

Figure 3:
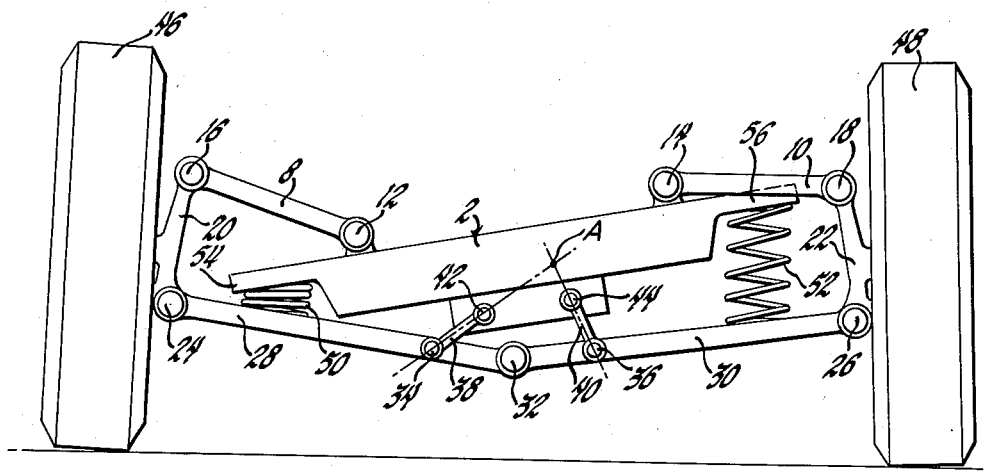
Fig. 3 is a view similar to Fig. 1 showing the geometric relation of the parts when the sprung mass is subjected to roll deflection to the right as viewed from the front of the vehicle.
Figure 4:
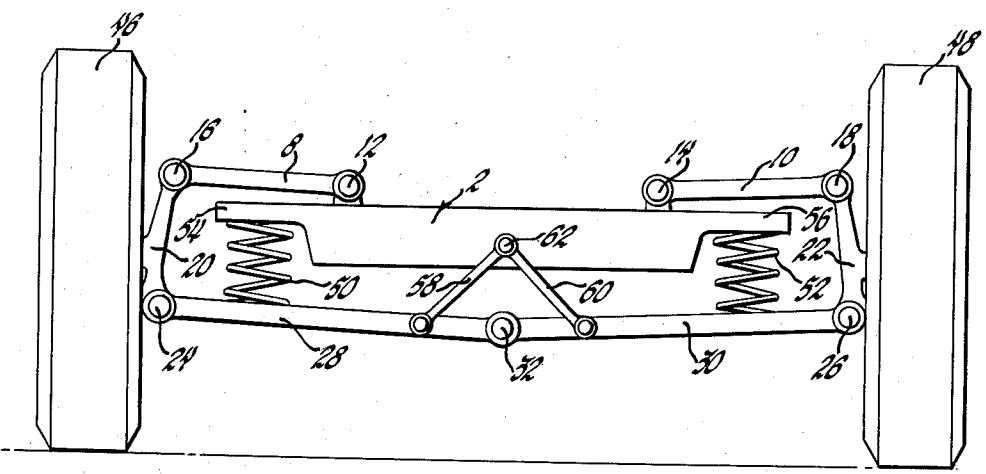
Fig. 4 is a modified form of the invention shown in Fig. 1.

In Fig. 4, there is illustrated a modification of the invention wherein links 38 and 40 are replaced by slightly longer links 58 and 60 which have their upper ends pivotally connected at a common point 62 located on cross frame member 2 co-linear with the vehicle centerline. It will be observed that the point 62 coincides identically with the imaginary point A defined by the projected planes of links 38 and 40 in Fig. 1. In operation, the modification of Fig. 4 differs only slightly from that of Fig. 1, the principal difference being that the point A remains fixed with respect to the cross member 2 rather than shifting slightly during deflection of the sprung mass as is the case in the embodiment shown in Fig. 1, owing to the shifting point of intersection of links 38 and 40 during roll (Fig. 3). Particular attention is directed to Figs. 2 and 3 wherein it will be observed that during both parallel ride deflection and highly exaggerated roll conditions, wheels 46 and 48 remain substantially perpendicular to the ground. It is in this connection that the subject invention differs from conventional high roll center independent suspensions. It will, of course, be obvious that conventional wishbone suspension arms may be initially inclined so that the instantaneous roll center achieved thereby will be located at a relatively high level. However, without exception, when the arms are so arranged, the resulting wheel movement thereof when the vehicle is subjected to parallel ride deflection produces excessive camber change resulting in tread width variation and undesirable tire scrub.

While but two embodiments of the invention have been shown and described, it will be apparent that other changes and modifications may be made therein. It is, therefore, to be understood that it is not intended to limit the invention to the embodiments shown, but only by the scope of the claims which follow.

I claim:

1. Independent suspension for a vehicle having spaced dirigible wheels, comprising, a support for each wheel, a pair of transversely extending upper control arms pivotally connected at their outer ends to said supports and at their inner ends to said vehicle, a pair of transversely extending lower control arms connected at their outer ends to said supports, a common pivot connecting the inner ends of said lower arms together, a pair of laterally spaced links pivotally connecting said lower arms to said vehicle, and spring means disposed between said vehicle and each lower control arm.

2. Independent wheel suspension for a vehicle, comprising a sprung portion, a pair of laterally spaced wheels, a support for each wheel, a pair of transversely extending upper control arms pivotally connected at their outer ends to one end of said supports and at their inner ends to said sprung portion, a pair of transversely extending lower control arms connected at their outer ends to the other end of said supports, a spring disposed between each lower control arm and said sprung portion, common pivot means connecting the inner ends of said lower arms together independently of said sprung portion, and a pair of links extending vertically between and pivotally connecting said sprung portion and said lower control arms, said links being disposed symmetrically with respect to said common pivot means.

3. Independent wheel suspension for a vehicle, comprising a sprung portion, a pair of laterally spaced wheels, a support for each wheel, a pair of transversely extending upper control arms pivotally connected at their outer ends to one end of said supports and at their inner ends to said sprung portion, a pair of transversely extending lower control arms connected at their outer ends to the other end of said supports, a spring disposed between each lower control arm and said sprung portion, common pivot means connecting the inner ends of said lower arms together independently of said sprung portion, and a pair of links extending vertically between and pivotally connecting said sprung portion and said lower control arms, said links being disposed symmetrically with respect to said common pivot means, and converging at a point vertically upwardly displaced therefrom.

4. Independent suspension for a vehicle having a frame and laterally spaced wheels, comprising, a support for each wheel, a pair of transversely extending upper control arms pivotally connected at their outer ends to said supports and at their inner ends to said frame, a pair of transversely extending lower control arms pivotally connected at their outer ends to said supports, a spring disposed between each lower control arm and said frame, common pivot means connecting the inner ends of said lower arms together, and a pair of links pivotally connecting said arms to said frame, the pivotal connection between each link and its associated arm being located on said arm nearer to the inner end than the outer end thereof, the pivotal connection between each link and said frame being located on said frame inwardly and upwardly relative to the first-mentioned pivotal connection.

5. The invention set forth in claim 4 wherein the pivotal connection between each link and said frame is a common pivotal connection.

6. In an independent suspension of the type having spaced wheels deflectably connected to a vehicle sprung mass by means of a first and second pair of oppositely transversely extending swingable control arms, spring means disposed between the sprung mass and one arm of said first and second pair of arms, means associated with one of said pairs of arms effective to provide a high roll deflection axis and a low parallel deflection axis for the sprung mass, said means comprising a common pivotal connection between the inner ends of said one pair of arms independent of said sprung mass, and a pair of vertically converging links pivotally connecting said one pair of arms to said sprung mass.

7. In an independent suspension of the type having spaced wheels deflectably connected to a vehicle sprung mass by means of a first and second pair of oppositely transversely extending swingable control arms, spring means disposed between said sprung mass and one arm of said first and second pair of arms, means associated with one of said pairs of arms effective to cause wheel movement about a high deflection axis during roll of the sprung mass and wheel movement about a low deflection axis during vertical movement of the sprung mass parallel with the ground, said means comprising a common pivotal connection between the inner ends of said one pair of arms independent of said sprung mass, and a pair of vertically upwardly converging links pivotally connecting said one pair of arms to said sprung mass.

8. In an independent suspension of the type having spaced wheels connected to a vehicle sprung mass by means of a vertically spaced first and second pair of oppositely transversely extending swingable control arms, spring means disposed between said sprung mass and one arm of said first and second pair of arms, means associated with one of said pairs of arms and said sprung mass effective to provide a roll deflection axis which is higher than the parallel deflection axis for the sprung mass, said means comprising a common pivotal connection between the inner ends of said one pair of arms which is movable relative to said sprung mass, and a pair of links pivotally connecting said one pair of arms to said sprung mass, said links being disposed in vertically non-parallel relation so that the intersection of the projected planes thereof lies above the axis defined by said common pivotal connection for said one pair of arms.

9. In an independent suspension of the type having spaced wheels connected to a vehicle sprung mass by means of a vertically spaced first and second pair of oppositely transversely extending swingable control arms, spring means disposed between said sprung mass and one arm of said first and second pair of arms, means associated with one of said pairs of arms and said sprung mass effective to provide a roll deflection axis which is higher than the parallel deflection axis for the sprung mass, said means comprising a common pivotal connection between the inner ends of said one pair of arms which is movable relative to said sprung mass, and a pair of links pivotally connecting said one pair of arms to said sprung mass, said links being disposed symmetrically in vertically non-parallel relation so that the intersection of the projected planes thereof lies above the axis defined by said common pivotal connection for said one pair of arms.

References Cited in the file of this patent

UNITED STATES PATENTS

| | | |
|---|---|---|
| 2,092,612 | Olley | Sept. 7, 1937 |
| 2,142,613 | Maples | Jan. 3, 1939 |
| 2,152,938 | Welch | Apr. 4, 1939 |
| 2,279,120 | Hurley | Apr. 7, 1942 |
| 2,314,076 | Casner | Mar. 16, 1943 |
| 2,524,505 | Yonamine | Oct. 3, 1950 |